United States Patent
Greb et al.

(10) Patent No.: US 7,936,984 B2
(45) Date of Patent: May 3, 2011

(54) STABILIZER DEVICE FOR OPTICAL EQUIPMENT

(75) Inventors: Richard G. Greb, Raleigh, NC (US); Adrian Sanderson, Raleigh, NC (US)

(73) Assignee: Camera Motion Research, LLC, Raleigh, NC (US)

( * ) Notice: Subject to any disclaimer, the term of this patent is extended or adjusted under 35 U.S.C. 154(b) by 352 days.

(21) Appl. No.: 12/100,902

(22) Filed: Apr. 10, 2008

(65) Prior Publication Data

US 2009/0257741 A1  Oct. 15, 2009

(51) Int. Cl.
*G03B 17/00* (2006.01)

(52) U.S. Cl. .......................................... 396/55; 396/421

(58) Field of Classification Search ................... 396/12, 396/13, 419–422, 424, 428, 55; 352/243; 248/218.4, 317, 325; 74/5 R, 5.34, 5.37, 74/5.4, 5.7, 5.22
See application file for complete search history.

(56) References Cited

U.S. PATENT DOCUMENTS

| | | | |
|---|---|---|---|
| 3,006,197 A * | 10/1961 | Kenyon et al. | 74/5.22 |
| 4,946,272 A | 8/1990 | Brown | |
| 5,098,182 A | 3/1992 | Brown | |
| 5,256,942 A * | 10/1993 | Wood | 318/649 |
| 5,737,657 A * | 4/1998 | Paddock et al. | 396/428 |
| 6,056,449 A * | 5/2000 | Hart | 396/421 |
| 6,714,729 B1 * | 3/2004 | Sugiura et al. | 396/19 |
| 2004/0233389 A1* | 11/2004 | Bruggaier | 352/243 |
| 2007/0058075 A1* | 3/2007 | DeSorbo | 348/373 |

OTHER PUBLICATIONS

Author Unknown. "Glidecam Customer Sled with Dual KS-4 Gyro kit and Body Pod." Production information available at: http://www.glidecam.com/product-gyro-ks-4.php.
Author Unknown. "Glidecam Custom Sled with Single KS-8 Gyro kit and Body Pod." Production information available at: http://www.glidecam.com/product-gyro-ks-8.php.
Author Unknown. "Hand Held Gyro Stabilzers." Production information available at: http://www.aerialimage.com/page5.htm.

* cited by examiner

*Primary Examiner* — W. B. Perkey
*Assistant Examiner* — Minh Q Phan
(74) *Attorney, Agent, or Firm* — Coats & Bennett, P.L.L.C.

(57) ABSTRACT

A stabilizer for a hand-held optical device includes a gyroscope assembly suspended below a base assembly, and a handle pivotably attached to the base assembly. The optical device, which may be a video camera, mounts to the base assembly. The gyroscope assembly has two or more rotatable members that pivot independently to stabilize the optical device about two or more axes of rotation whenever the user moves the stabilizer. A rigid strut connects the gyroscope to the base assembly such that the centers of rotation of the rotatable members are co-linear with a longitudinal axis that extends the handle.

30 Claims, 15 Drawing Sheets

STABILIZER DEVICE FOR OPTICAL EQUIPMENT

TECHNICAL FIELD

The present invention relates generally to stabilizers for optical equipment, and particularly to hand-held stabilizer devices that isolate portable cameras from the undesirable effects of user motion.

BACKGROUND

Many people who use hand-held video cameras will move with their cameras to film a scene. Unfortunately, such user movement can cause motion that will undesirably affect the camera's ability to record smooth and pleasing video. Many video cameras have internal mechanisms that substantially eliminate certain types of undesirable effects, such as "shake." However, these internal mechanisms do not eliminate all types of undesired motion.

For example, moving the camera can induce unwanted motion about the roll, tilt, and pan axes. As seen in FIG. 1, the roll, tilt, and pan axes are defined for clarity as the x, y, and z-axes, respectively. A camera's internal stabilizing mechanisms are not well-suited to address gross motion about these axes. Thus, to eliminate undesired motion about the axes, users typically must employ expensive and complicated camera stabilizers.

Camera stabilizers for video cameras and other optical equipment have been in use for many years. Generally, camera stabilizers are external devices that function to isolate the body of a camera or other optical equipment from the unwanted effects of a user's body movements. Such isolation can eliminate or greatly reduce the undesirable effects in the roll, tilt, and pan directions, thereby providing a smooth video or film recording for the user.

Currently available stabilizers, such as passive inertial stabilizers, generally rely on two principles to achieve smooth video recordings. The first principle uses a mass that connects to, but is spaced away from, the body of the camera. The mass may comprise one or more weights or masses that counterbalance the camera about a pivot point near a center of gravity of the stabilizer. Separating the camera and the mass from the center of gravity increases the moments of inertia of the stabilizer in at least the roll and tilt directions (e.g., the x and y-axes). Thus, a counterbalanced system is more stable in these two axes than the camera is alone. Depending on the distribution of the mass, the counterbalancing mass or masses can also increase a moment of inertia in the pan direction (e.g., z-axis).

The second principle uses gimbals at a support point for the stabilizer structure. As those skilled in the art understand, a gimbal is a pivoted support that permits an object to rotate freely about a single axis. Passive inertial stabilizers typically employ multiple gimbals at a support point on the stabilizer. Each gimbal pivots about a different axis of rotation (e.g., x-axis, y-axis, and z-axis) to allow the stabilizer (and thus, the mounted camera) to rotate about those axes freely. Allowing free rotation in all three axes of rotation effectively isolates the camera from the motions of the user in the roll, tilt, and pan directions.

Users generally prefer balanced camera stabilizers that are slightly bottom-heavy. For example, the mass or masses used to counterbalance the camera may be positioned below the camera such that a center of gravity of the stabilizer is below a point about which the stabilizer pivots. Such stabilizers require little or no operator intervention to maintain the camera parallel to the horizon, which is the most common shot framing position. Even when a camera wanders off-axis, the slightly bottom heavy nature of the stabilizer causes it to automatically return the camera to its original position.

However, bottom-heavy stabilizers usually introduce reaction torques whenever an operator accelerates. That is, with a bottom heavy balance position, any acceleration, including movement in an arc, could produce unwanted motion. Thus, when the operator moves in a direction (e.g., forward), the camera, which mounts to the stabilizer opposite the bottom-heavy portion of the stabilizer, will tend to move in the same direction as the operator (e.g., forward). The slightly bottom-heavy portion of the stabilizer, however, will lag behind the camera. Although the camera will slowly return to its original position, such movement may cause the camera to rock undesirably, and can only be reduced by the skill of the operator. Other conditions and factors, such as wind while filming outdoors or the imperfect design or construction of the stabilizer, can also cause the camera to experience unwanted motion.

To improve camera stability, some manufacturers employ gyroscopes attached directly to the cameras or mounted to a passive stabilizer. For example, Kenyon Laboratories of Higganum, Conn., (http://www.ken-lab.com) sells gyroscopes that mount directly to a camera or camera structure. Other manufacturers, such as Glidecam Industries, Kingston, Mass. (http://www.glidecam.com/products.php) employ gyroscopes supported by a platform that is connected to the camera.

Prior art stabilizers that use gyroscopes, however, are relatively heavy and expensive, and do not provide an optimal combination of platform stabilization and camera control. Further, existing gyroscopes require long startup times and shutdown times, and may restrict an operator's ability to control desired camera movement in the tilt, roll or pan directions. Therefore, prior art stabilizers are not practical for hand-held use.

SUMMARY

The present invention provides a stabilizer for a hand-held camera, such as a video camera. In one embodiment, the stabilizer comprises a base assembly, a handle assembly, a gyroscope pod, and a rigid arcuate strut that fixedly attaches the gyroscope pod to the base assembly.

The base assembly includes a platform and a battery compartment that encloses control circuitry and a power source. The platform is configured to releasably mount the camera, and moves along a plane independently of battery compartment. The handle assembly pivotably attaches a handle to a bottom surface of the battery compartment, and extends along a longitudinal axis.

The strut suspends the gyroscope pod, which comprises two or more rotating members such as disks, for example, below the base assembly and the handle assembly. The strut positions the gyroscope pod to align the centers of rotation of each rotating member co-linearly along the longitudinal axis. This co-linear alignment provides the user with the ability to control the unwanted movement of the stabilizer that may result from the motion of the user.

In operation, a user mounts the camera to the platform. During filming, the user may move the stabilizer to follow a moving subject, or to capture an expansive scene, for example. Such motion may cause the camera to undesirably move while recording. However, the rotating members within the gyroscope are mounted to pivot about independent axes to counter the effects of such motion in the roll and tilt directions. This control stabilizes the camera allowing it to record smooth video. In some embodiments, the stabilizer can also control the camera's unwanted rotation about the longitudinal axis.

DETAILED DESCRIPTION

Users typically move optical recording devices, such as hand-held cameras, while filming video. Such movement can often produce forces that disturb the camera's stability and/or orientation. Particularly, these forces can cause unwanted rotational motion for the camera in a roll, tilt and/or panning direction that interferes with the camera's ability to produce smooth video.

The present invention provides a stabilizer for a hand-held video camera that greatly reduces or eliminates the effects of these unwanted forces on the camera. Particularly, the user mounts a hand-held camera to the stabilizer for filming. User movement while filming causes the unwanted forces that act on the camera and the stabilizer. However, the stabilizer of the present invention isolates the camera from the undesirable effects of these forces by controlling the camera's rotational motion about a roll axis, a tilt axis, and a pan axis. Such control stabilizes the camera and helps to maintain its orientation as the user moves the stabilizer with the camera attached.

Figure 1:
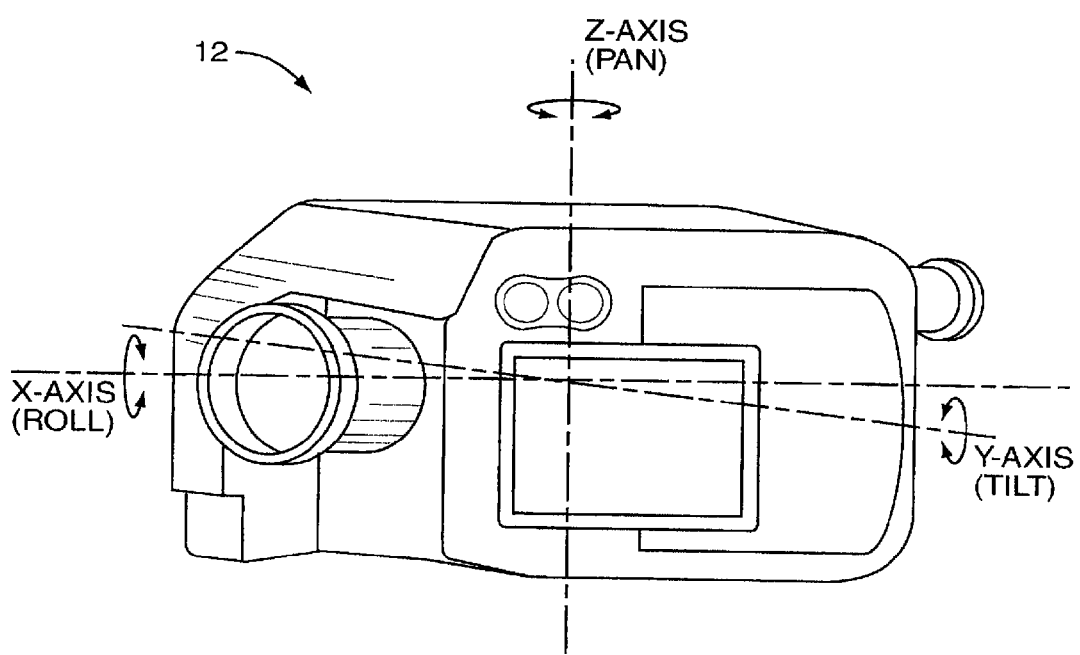
FIG. 1 is a perspective view illustrating a video camera and three axes of rotation.
Figure 2:
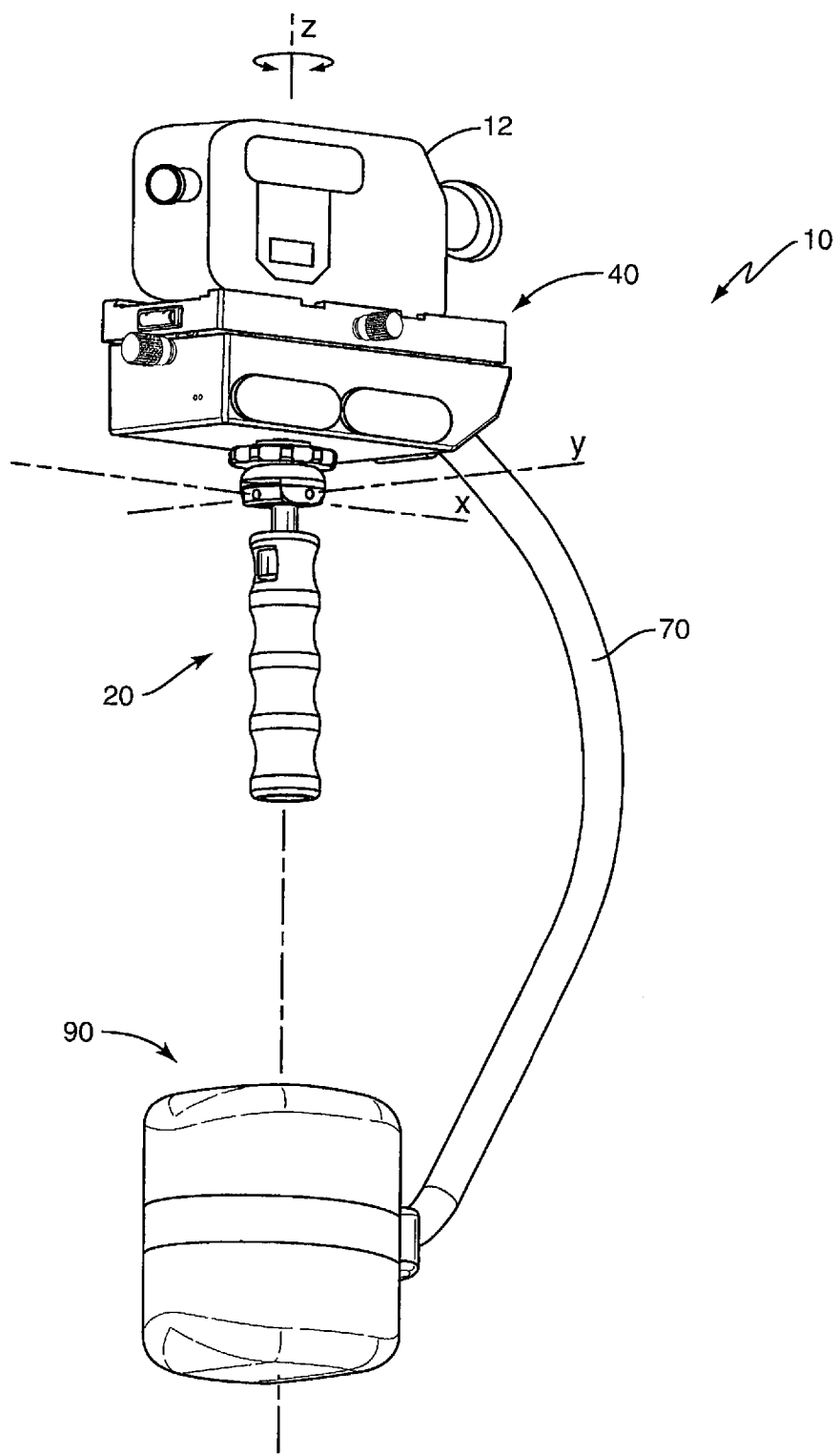
FIG. 2 is a perspective view that illustrates a stabilizer for a hand-held camera according to one embodiment of the present invention.

FIG. 2 is a perspective view illustrating a stabilizer configured according to one embodiment of the present invention. The stabilizer, generally indicated by the number 10, is a unitary device upon which a camera 12 may be releasably mounted. The stabilizer 10 comprises a handle assembly 20, a base assembly 40, and a gyroscope pod 90. A rigid support member, such as strut 70, fixedly attaches the gyroscope pod 90 to the base assembly 40.

As described in more detail below, the gyroscope pod 90 comprises two or more rotating members, such as disks, for example, that are driven by motors to rotate at high velocities. The strut 70 suspends the gyroscope pod 90 below the base assembly 40 such that the centers of rotation of the disks within pod 90 are aligned with a pan axis (i.e., the z-axis) that extends longitudinally through the handle assembly 20. Each motor and disk is pivotably mounted on a single gimbal to allow each disk to pivot about a single axis. As the user moves the stabilizer, the disks precess about their respective axes to react against the torques produced by the user movement. This reaction force opposes rotation of the stabilizer about the roll and tilt axes, thereby stabilizing the camera against movement in the roll, tilt directions.

Figure 3:
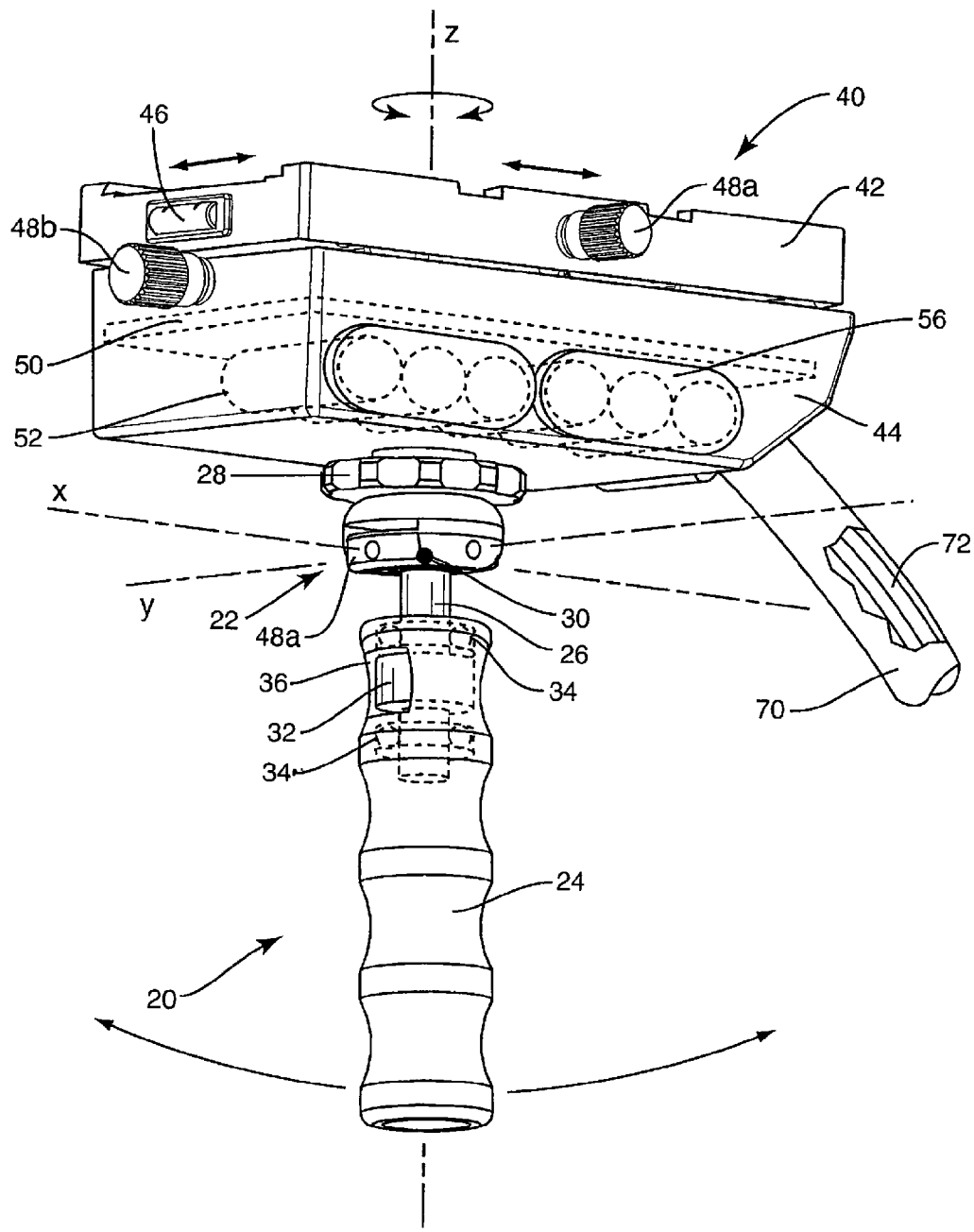
FIGS. 3 and 4 are perspective views that illustrate the handle assembly and the base assembly of a stabilizer according to one embodiment of the present invention.
Figure 4:
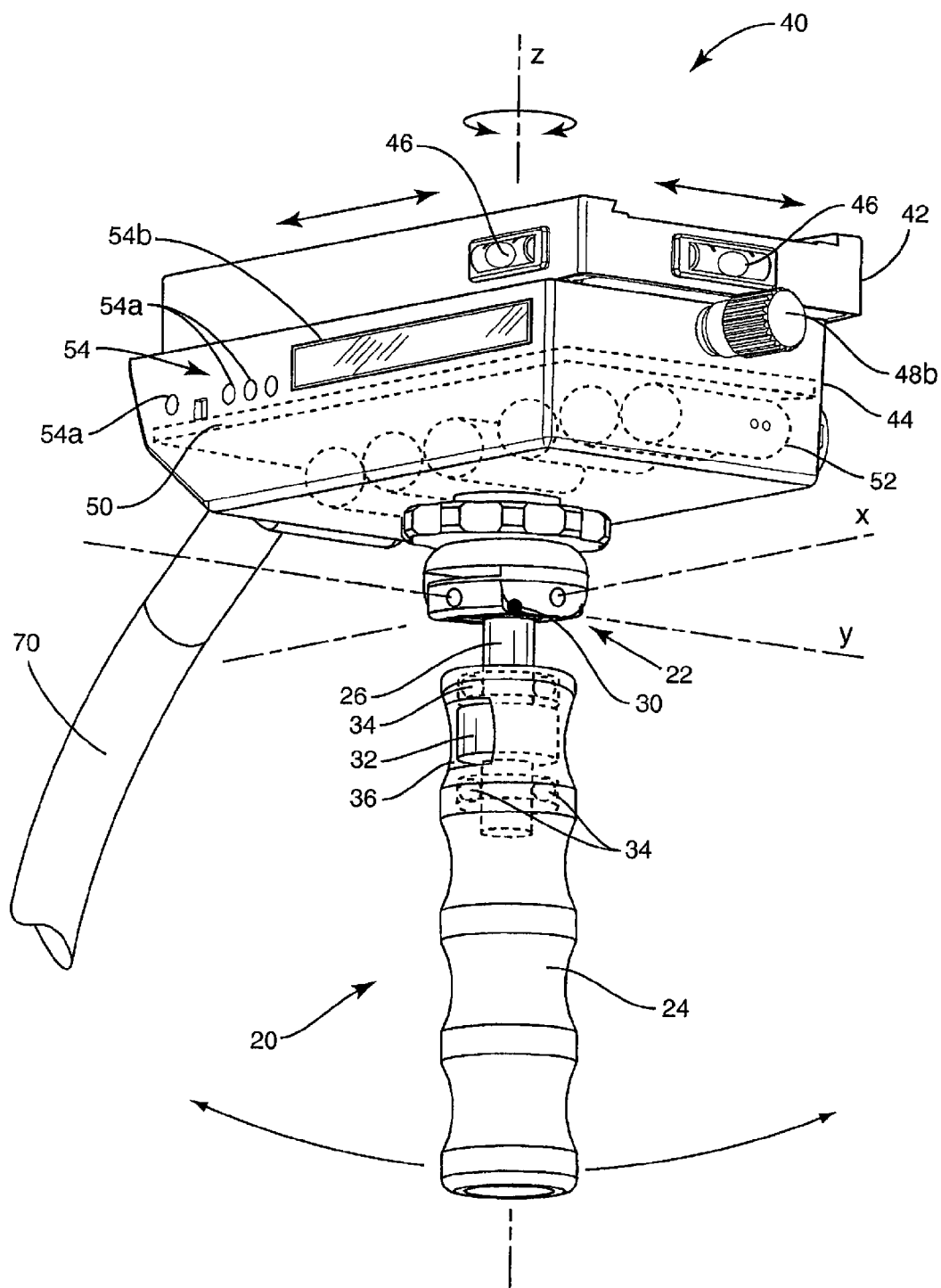

FIGS. 3 and 4 illustrate the handle assembly 20 and the base assembly 40 in more detail. The handle assembly 20 comprises a pivot support 22 attached to the base assembly 40, a handle grip 24, and an elongated shaft 26 that connects the handle grip 24 to the pivot support 22. An adjustment mechanism 28 rotates about the z-axis to allow the user to adjust the distance between the handle grip 24 and the base assembly 40 for proper balance in the z-axis.

The pivot support 22 pivotably connects the handle grip 24 to the base assembly 40. In this embodiment, the pivot support 22 comprises a two-axis gimbal mounted between the handle grip 24 and a bottom of the base assembly 40; however, other two-axis mechanisms are equally as suitable. The pivot support 22 defines an x-axis (i.e., the roll axis) and a y-axis (i.e., the tilt axis), and pivots about those axes to provide the handle grip 24 and the shaft 26 with two degrees of freedom. However, the pivot support 22 remains in a fixed position relative to both the base assembly 40 and the gyroscope pod 90. As seen in the figures, the x and y-axes are orthogonal to each other, and intersect at a first common intersection point 30 located within the pivot support 22. Similarly, the z-axis is orthogonal to both the x and the y-axes, and intersects those axes at the common point 30.

The handle assembly 20 also includes a panning control that provides the user within a third degree of freedom about the z-axis (i.e., pan axis). The panning control comprises a recessed control wheel 32 fixedly attached to the shaft 26, and a plurality of ball bearings 34 positioned above and below control wheel 32. In this embodiment, the bearings 34 are located within the interior of the handle grip 24 below the pivot support 22 and the common intersection point 30. The handle grip 24 also includes a window 36 through which the user can access the control wheel 32 with a finger or thumb, for example.

In operation, the user places his or her index finger, for example, on the control wheel 32 while gripping the handle grip 24. The ball bearings 34 allow the handle grip 24 to rotate about the z-axis independently of the shaft 26. Therefore, when the user applies a rotational force to the control wheel 32 with his finger, it causes the control wheel 32 and the shaft 26, and thus, the stabilizer 10, to rotate about the z-axis. To stop or prevent the stabilizer 10 from rotating about the z-axis, the user simply presses his finger against the control wheel 32 to apply a force that is generally orthogonal to the z-axis. Such directional force "locks" the stabilizer 10 in place and prevents its rotation about the z-axis.

The base assembly 40 comprises a platform 42 and a base compartment 44. As described below in more detail, a pair of rotatable adjustment controls 48 allows the user to adjust the position of the platform 42 in a plane independently of base compartment 44 and the other components of stabilizer 10. A pair of levels 46 provides a visual indication of whether the stabilizer 10 is level or parallel to the horizon.

Any mechanism known in the art may be used to move the platform 42; however in one embodiment, a mechanical linkage movably connects the platform 42 to the base compartment 44. A first adjustment control 48a is disposed on a sidewall of the platform 42, and a second adjustment control 48b is disposed on a sidewall of the base compartment 44. Both controls 48 connect to the linkage and rotate independently to move the platform 42 in a plane that is substantially parallel to the x and y-axis. The ability to adjust the position of the platform 42 in this "x-y plane" independently of the other components of the stabilizer 10 allows the user to balance the stabilizer 10 and achieve optimal gyroscope performance. This occurs when the center of gravity of the stabilizer 10, with the camera 12 mounted to the platform 42, is coincident with the z-axis. It also prevents torque produced by forces related to user motion and applied along the x and y-axes from acting on the stabilizer 10 along the z-axis.

The base compartment 44 is sized to contain a printed circuit board (PCB) 50 and a power source 52 to supply electrical power to the stabilizer 10. A user interface 54, which may comprise Light Emitting Diodes (LED) 54a, a display 54b, and/or other user interfaces and controls such as one or more buttons to receive user input, is disposed on a sidewall of base compartment 44. A user could, for example, start and stop the stabilizer 10 by actuating one or more buttons on the user interface 54, and/or vary the velocity of the disks in the gyroscope pod 90 as described in more detail later. In a preferred embodiment, the power source 52 comprises a plurality of rechargeable AA nickel-metal hydride (NiMH) batteries that are inserted into one or more battery compartments 58 through one or more access doors. Besides being rechargeable, NiMH batteries provide a good balance between the energy they provide, useful life, and weight. However, as those skilled in the art will readily appreciate, the present invention is not limited solely to using these types of batteries as a power source. Stabilizer 10 may use any type of battery.

Figure 5:
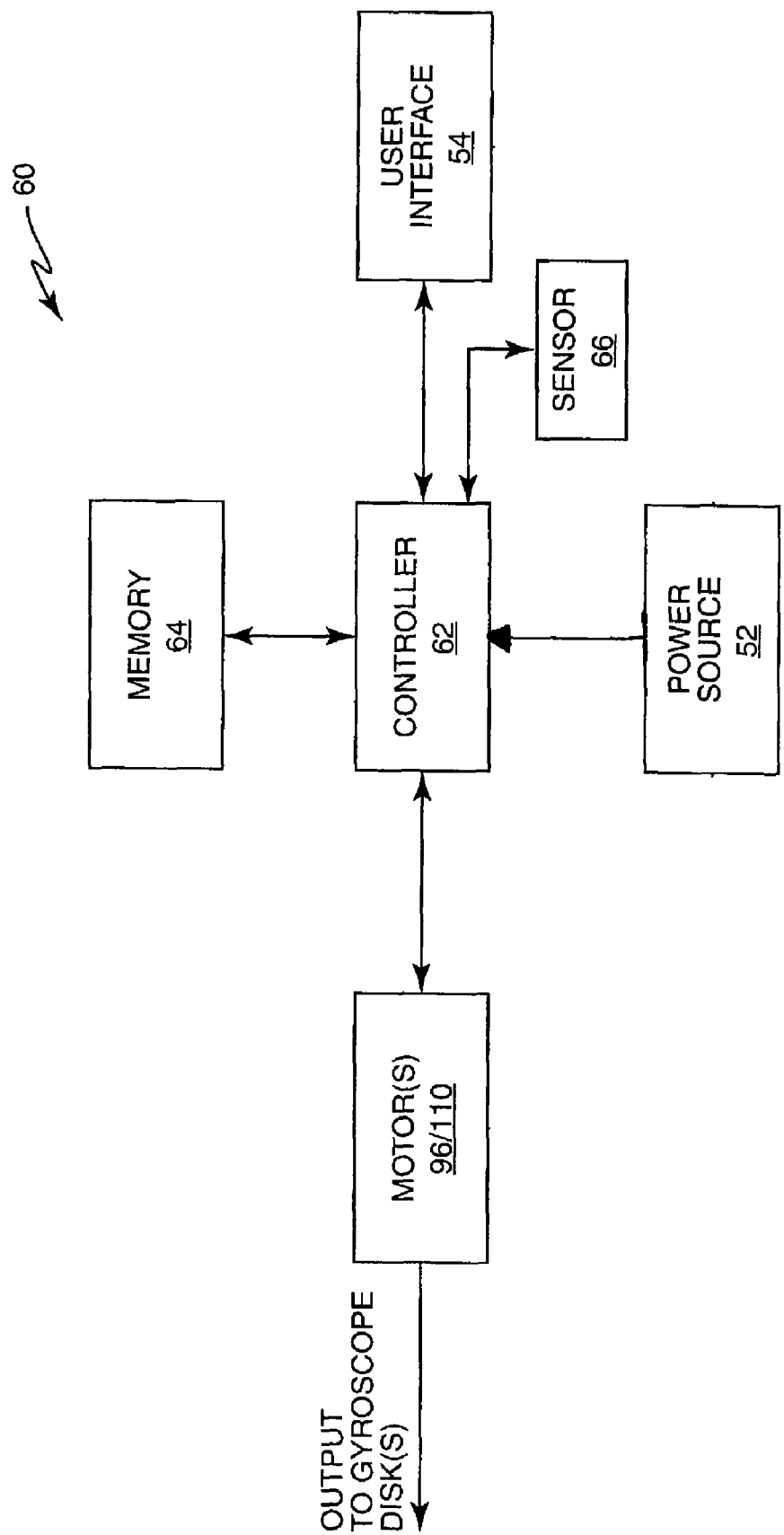
FIG. 5 is a block diagram illustrating a control circuit for controlling the stabilizer according to one embodiment of the present invention.

The PCB 50 includes a variety of electronic components and circuitry responsible for the operation of the stabilizer 10. One such circuit, seen in FIG. 5, comprises a control circuit 60 having a controller 62 and a memory 64. In some embodiments, described later in more detail, PCB 50 may also include a sensor 66 that detects rotation of the stabilizer about the longitudinal z-axis.

The controller 62, which may comprise one or more microprocessors, controls the operation of the stabilizer based on application programs and data stored in memory 64. In one embodiment, controller 62 monitors the operation of the stabilizer 10 and generates appropriate control signals to operate the user interface 54. For example, the controller 62 could generate signals to light different LEDs 54a to indicate various operating modes and/or error conditions to the user and/ or receive from one or more input controls such as buttons on user interface 54. In another embodiment, the controller 62 outputs various messages to the display 54b to indicate the modes or error conditions. In some embodiments, the display 54b may be a touch sensitive display to allow a user to input commands to control the stabilizer 10 operation.

The controller 62 also controls the operation of the motors in the gyroscope pod 90. As previously stated, the gyroscope pod 90 encases two or more disks that are driven to rotate by two or more motors. In one simple embodiment, the controller 62 controls the rotation of the gyroscope disks by generating and sending control signals to turn the motors on and off. In a more complex embodiment, the controller 62 controls the rotational velocities of the gyroscope disks based on the operating mode of the stabilizer 10. For example, the user could operate the user interface 54 to alternately place the stabilizer 10 in a high-speed mode and a low-speed mode. In the high-speed mode, the gyroscope disks would rotate at full speed about the z-axis (e.g., 15,000 rpm) to stabilize the camera 12. The controller 62 could generate control signals to maintain the gyroscope disks rotating at this speed. In the low-speed mode, however, the controller 62 could generate other control signals to slow the rotational velocities of the gyroscope disks. Varying the speed of the disks conserves battery power and allows a user to adjust the amount of gyro response to the movement of the stabilizer 10. Further, because the disks are already rotating, it reduces the time required for the disks to achieve full speed.

Maintaining the velocities of the gyroscope disks, however, would require a feedback loop so that the controller 62 could monitor and alter the disk velocity as needed, or in cases where brushless direct current (BLDC) motors are used, provide correct commutation. For example, the motors that drive the gyroscope disks could include sensors or encoders that provide such feedback to the controller 62. Based on that feedback, the controller 62 would generate control signals to ensure that the motors continue to drive the disks to rotate at a particular velocity.

However, in some embodiments, the present invention employs motors that do not have sensors. For such "sensorless" motors, the controller 62 would have to determine the velocities of the gyroscope disks using other means, and then generate the appropriate control signals to automatically vary the rotational velocities of the gyroscope disks to ensure that they rotate at a substantially constant velocity. For example, the controller 62 could employ a well-known technique known as "back electro magnetic force (EMF)" sensing to determine and control the rotational speeds of the gyroscope disks. With this type of sensing, the controller 62 periodically measures the EMF in the motor coils to infer the positions of the motor rotor at a given instant. Based on this position information, and knowing the time over which the measurements are performed, the controller 62 could use well-known techniques to control motor commutation and calculate the velocities of the rotating gyroscope disks. Based on the calculated velocities, the controller 62 would generate control signals to increase/decrease the disk velocities as needed.

As previously stated, the stabilizer 10 includes a strut 70. As seen in the figures, the strut 70 comprises a rigid, arcuate member that is independent of the handle assembly 20. Strut 70 structurally connects the gyroscope pod 90 to the base assembly 40, and is substantially hollow to enclose the cables or wires 72 that electrically connect the gyroscope pod 90 to the base assembly 40. However, the strut 70 also performs another function. Particularly, the strut 70 suspends the gyroscope pod 90 below the pivot support 22 and the base assembly 40 to maintain the position the disks within the gyroscope pod 90 for optimal stabilization of the stabilizer 10.

Figure 6:
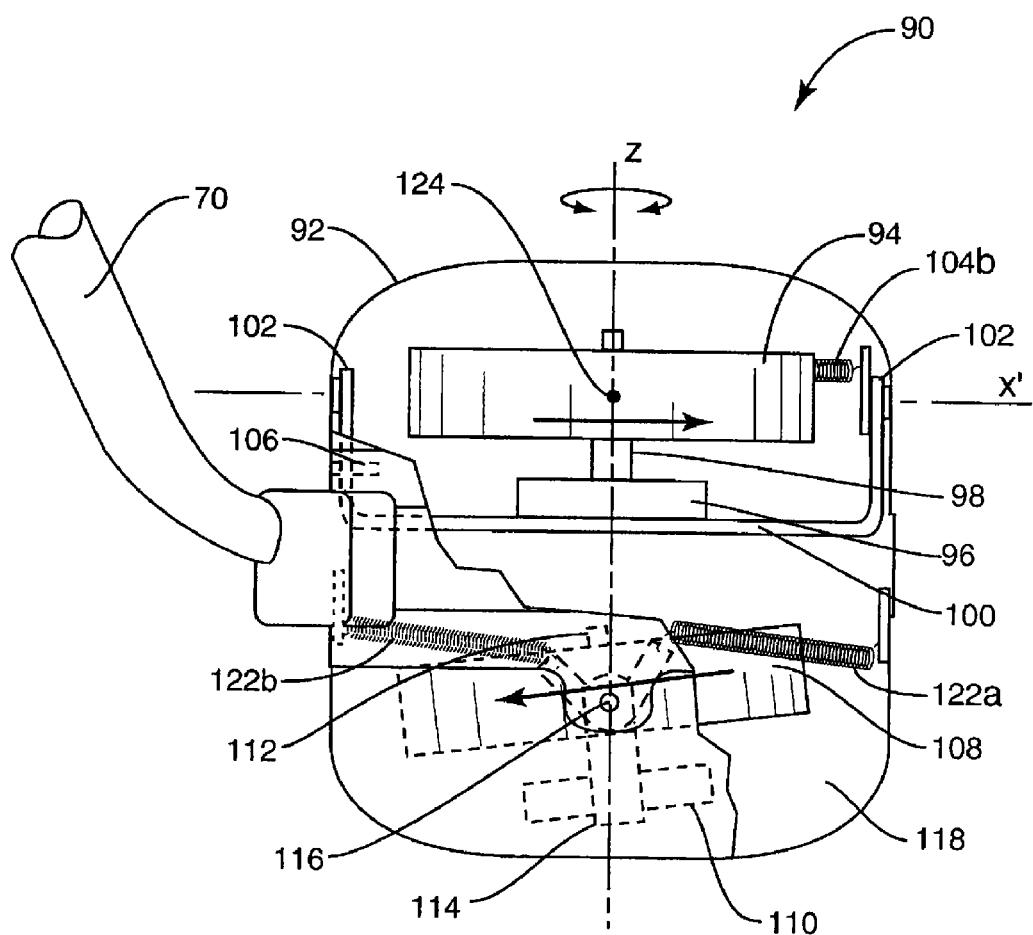
FIGS. 6 and 7 are perspective views illustrating a gyroscope pod of a stabilizer according to one embodiment of the present invention.
Figure 7:
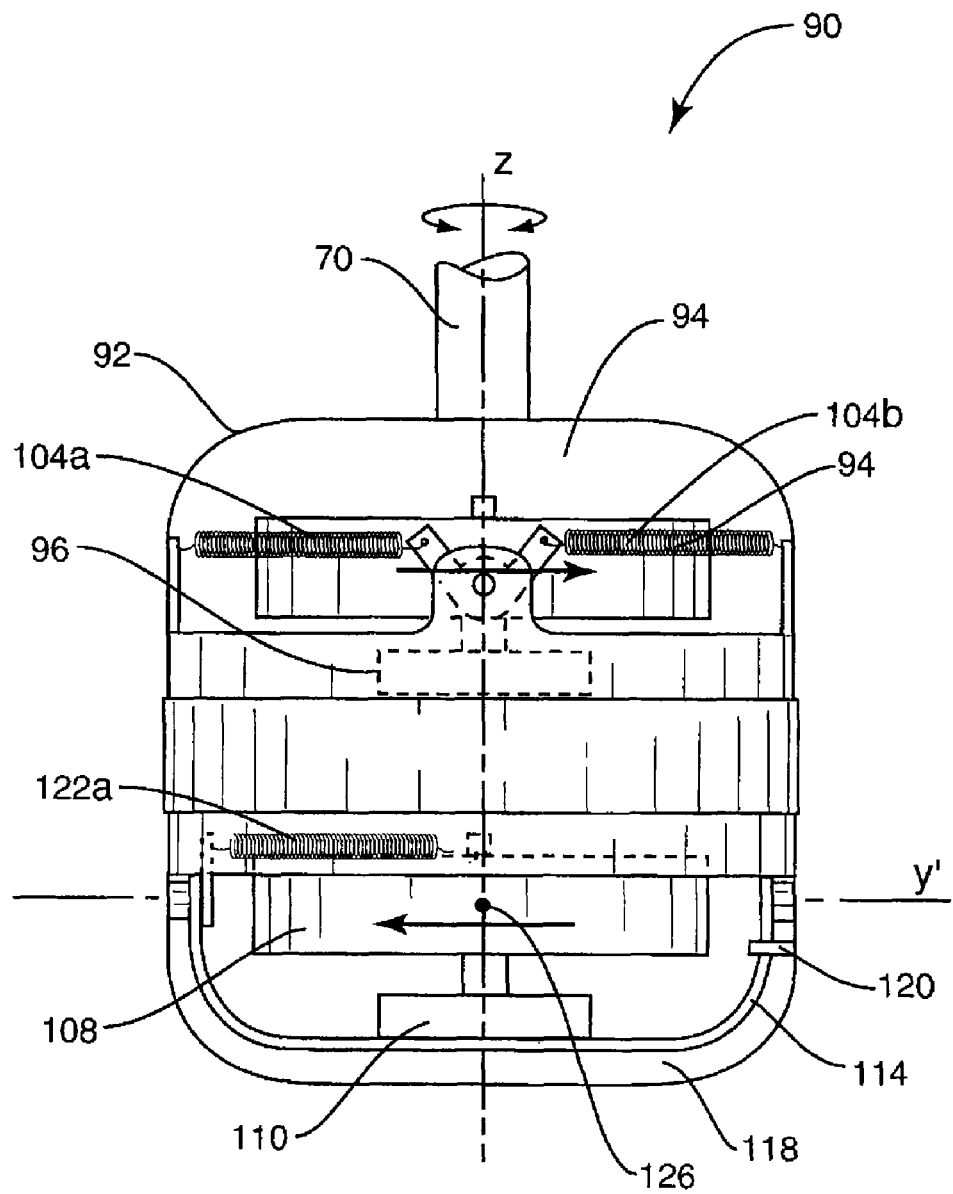

FIGS. 6 and 7 illustrate the interior of gyroscope pod 90 in more detail. The gyroscope pod 90 comprises a housing 92 that hermetically seals a pair of opposing rotating members, such as gyroscope disks 94 and 108. In one embodiment, the housing is filled with a helium gas 118 to reduce aerodynamic drag on the rotating disks 94, 108. A first motor 96 drives the first disk 94 via an output shaft 98. The motor 96 in this embodiment comprises a sensorless, inner rotor brushless direct current (BLDC) motor having three poles, although the present invention is not limited to any particular type of motor. Other motors, such as outer rotor types, are also suitable.

The motor 96 is electrically connected to the base compartment 44 via flexible cabling 72 that extends through the strut 70 and the sidewall of the housing 92. In one embodiment, the cabling 72 connects to flexible flying leads attached to the motor 98 to allow for precession of the first disk 94. The motor 96 receives power via the cabling 72 from the power source 52, and drives the rotation of disk 94 according to control signals received from the controller 62. The housing 92 is sealed around the cables 72 to prevent the helium gas 118 from escaping.

The motor 96 and the first disk 94 are mounted to a bracket 100 that is pivotably attached to a support structure via a pair of gimbals 102. The gimbals 102 allow for a certain amount of torque-induced precession in the first disk 94, however, the distance that the first disk 94 may move off-axis is limited by one or more stops 106 positioned on each side of the bracket 100. Such torque-induced precession occurs during operator motion with the stabilizer 10. If the first disk 94 does move off axis, one or more biasing members, which may be a pair of coil springs 104a and 104b, for example, automatically restores the rotating first disk 94 to its neutral position, which in this embodiment, is rotating about the z-axis.

Additionally, the coil springs 104, which may be any linear or non-linear biasing member, yieldingly resist the pivoting motion of the first disk 94 to reduce the precession of the first disk 94 and the gyro reaction torque. That is, the coil springs 104 are selected to slightly restrain the precessional motion of the first disk 94. Restraining the precession of the first disk 94 prevents abrupt contact between the bracket 100 and the stops 106. Such contact may cause "gyro jump" resulting in an undesirable reaction torque in the stabilizer 10. To minimize this effect, the coil springs 104 are selected based on a spring constant that exhibits suitable gyro-restoring and/or dynamic stabilization. The optimum spring strength is a tradeoff between the gyro stabilizing effect and reducing "gyro jump."

A second motor 110, which may also comprise a sensorless BLDC motor, drives the second disk 108 via an output shaft 112 to rotate about the z-axis. As above, motor 110 receives power via the cabling 72 from the power source 52, and drives the rotation of disk 108 according to control signals received from the controller 62. Both the motor 110 and the second disk 108 are mounted to a bracket 114 that is pivotably attached to the support structure via another pair of gimbals 116. Gimbals 116 also allow for a certain amount of torque-induced precession in the second disk 108, which is limited by one or more stops 120 positioned on each side of the bracket 114. One or more biasing members such as a pair of coil springs 122a and 122b automatically restores the rotating second disk 108 to its neutral position, and yieldingly resists the precession of the second disk. As above, the coil springs 122 may be selected based on a spring constant that exhibits suitable gyro-restoring and/or dynamic stabilization, and may comprise linear or non-linear springs.

Although the figures illustrate the biasing members as being pairs of coil springs, the present invention is not so limited. In one embodiment, a single biasing member is used for each of the first and second disks 94, 108. In another embodiment, a third biasing member such as a linear or non-linear coil spring may be added to the first and second disks 94, 108 opposite the other coil springs 104, 122. Electrically insulating each of the coil springs would then allow those springs to be used to deliver phase voltages to their respective motors. Such a configuration could eliminate the need to run flying leads to each of the motors 96, 110.

As previously stated the motors 96, 110 comprise BLDC type motors. This type of motor is well suited to a well-known technique called dynamic braking to electrically slow or stop the motors 96, 110. In one embodiment, for example, the controller 62 generates control signals to provide fast dynamic braking (e.g., less than 30 seconds) of the very high angular momentum disks 94, 108 responsive to receiving a shut down command from the user. This allows for a shut down time that is less than 1/10 the time it would take to shut down without dynamic braking, and typically, within 1/20 to 1/30 the un-braked time. Such fast shut down times allows the user to pack the stabilizer 10 or remove the camera 12 in a much shorter time.

As seen in FIGS. 6 and 7, each disk 94, 108 rotates in opposite directions, and each has an axis of rotation that is co-linear with the z-axis. However, the corresponding gimbals 102, 116 are positioned 90° apart to define corresponding gimbal pivot axes x', y'. In one embodiment, the axes x', y' about which the disks 94, 108 pivot are substantially parallel to the x and y-axes defined by the pivot support 22. Such alignment allows the disks 94, 108 to pivot about the x' and y'-axes, respectively, to provide stabilization for the camera 12 in the roll and tilt directions (i.e., in the x-y plane). However, as those skilled in the art will appreciate, the pivot axes x', y' are shown for illustrative purposes only.

As stated above, the strut 70 positions the gyroscope pod 90 below the pivot support 22 such that the disks 94, 108 are aligned with the longitudinal z-axis. More particularly, the axis of rotation for the first disk 94 orthogonally intersects its pivot axis x' at a common intersection point 124. Similarly, the axis of rotation for the second disk 108 orthogonally intersects its pivot axis y' at a common intersection point 126. With the present invention, the strut 90 suspends the gyroscope pod 90 below the pivot support 22 such that each of the common intersection points 30, 124, 126 are aligned with each other and along the longitudinal z-axis. Further, the strut 70 maintains the common intersection points 30, 124, 126 in this alignment regardless of whether the stabilizer 10 is moving and, as seen later in more detail, regardless of the directions of their rotational and/or pivot axes. Such alignment provides optimal stabilization for the camera 12.

The gimbals 102, and/or 116 may be positioned as needed or desired to permit the disks 94, 108 to pivot about axes that are not aligned with the x and y-axis. In one embodiment, for example, the gimbals 102, 116 are positioned such that the angle φ between the pivot axes x', y' is about 60°. Orienting the bisection of angle φ in the x-y plane in a particular orientation (e.g., x, y') increases the gyroscopic effect in that direction, while maintaining significant stabilization in an orthogonal direction (e.g., x, y").

In addition, the gyroscope disks 94, 108 may also be employed to provide limited stabilization when panning. Particularly, the disks 94, 108 may be oriented such that they rotate slightly off the longitudinal z-axis. This may be accomplished, for example, by setting the coil springs 104, 122 to maintain the disks 94, 108 in a position such that their rotational axes are between about 5 and 10 degrees off the longitudinal z-axis, however, other angles may be used. In this configuration, the stabilizer 10 would provide a limited amount of gyro dynamic effect for z-axis rotation while maintaining nearly full x and y-axis stabilization.

Although this "off-axis" disk configuration provides some stabilization about the z-axis, it can also impede the ease with which a user can control the panning motion of the stabilizer 10, or produce unwanted gryoscopic forces. Users, often wish to move their cameras in a panning motion, which would trigger the z-axis stabilization. Therefore, the present invention contemplates other methods to provide z-axis stabilization while maintaining the rotational axes of the disks 94, 108 to be co-linear with the z-axis.

As stated above, the PCB 50 includes a sensor 66 that is positioned to lie on the z-axis. One commercially available sensor that is suitable for use with the present invention is the ADXRS401 sensor manufactured by ANALOG DEVICES, INC., although other sensors could be used. The sensor 66 detects angular motion of the stabilizer 10 about the z-axis, and outputs corresponding signals to the controller 62. Responsive to these signals, the controller 62 sends one or more control signals to motor drivers, which control the motors 96, 110 to increase or decrease the velocity of the gyroscope disks 94, 108 as necessary. Varying the disk velocity creates a reaction torque that opposes the sensed z-axis rotation of the stabilizer 10 thereby stabilizing the camera 12.

In one embodiment, with the controller 62 dynamically brakes the motors 96, 110 using Pulse Width Modulation (PWM) control. Such control is an effective method of achieving fast speed changes, however, other control methods may also be suitable. The motors 96, 110 rotate in opposite directions, and thus, braking may be applied to the appropriate motor 96 and/or 110 to cause the gyroscope pod 90 to produce the appropriate reaction torque. Generally, cumulative loss of motor speed does not occur because the required reaction torques are bi-directional, thereby allowing each motor 96, 110 time to recover speed slowly without producing unwanted reaction torque. The controller 62 may control each motor 96, 110 together or independently.

The controller 62 may generate the control signals to control the disk 94, 108 velocities as often as needed or desired. More frequent changes could keep the reaction-torques mild and therefore, less noticeable to the user. Less frequent changes, in contrast, could require stronger, more noticeable corrections in the disk velocities. The user could, in some embodiments, enable and disable this z-axis control via a user control disposed on the handle grip 24, for example.

Figure 8:
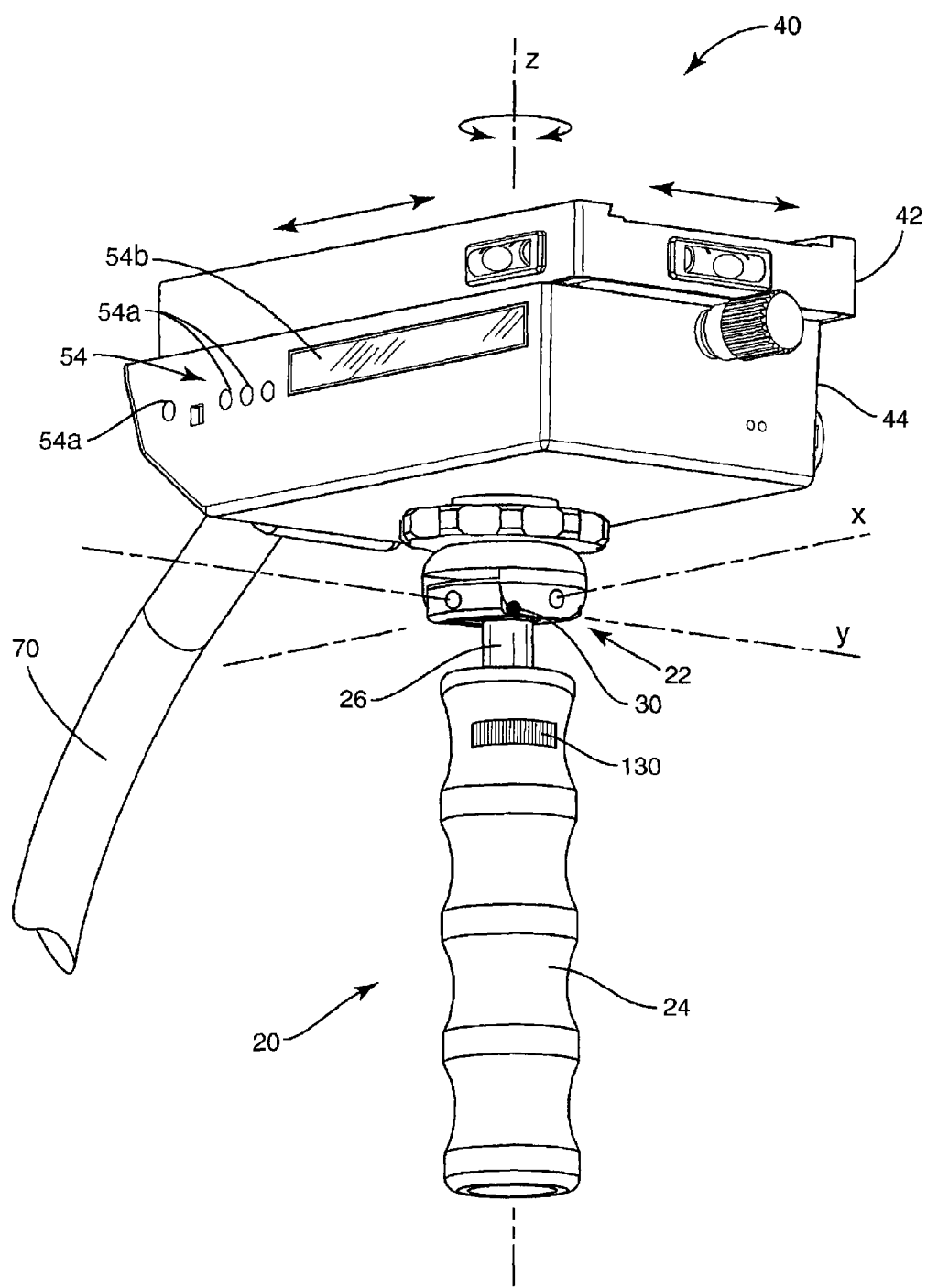
FIG. 8 is a perspective view that illustrates a handle configuration according to one embodiment of the present invention.
Figure 9:
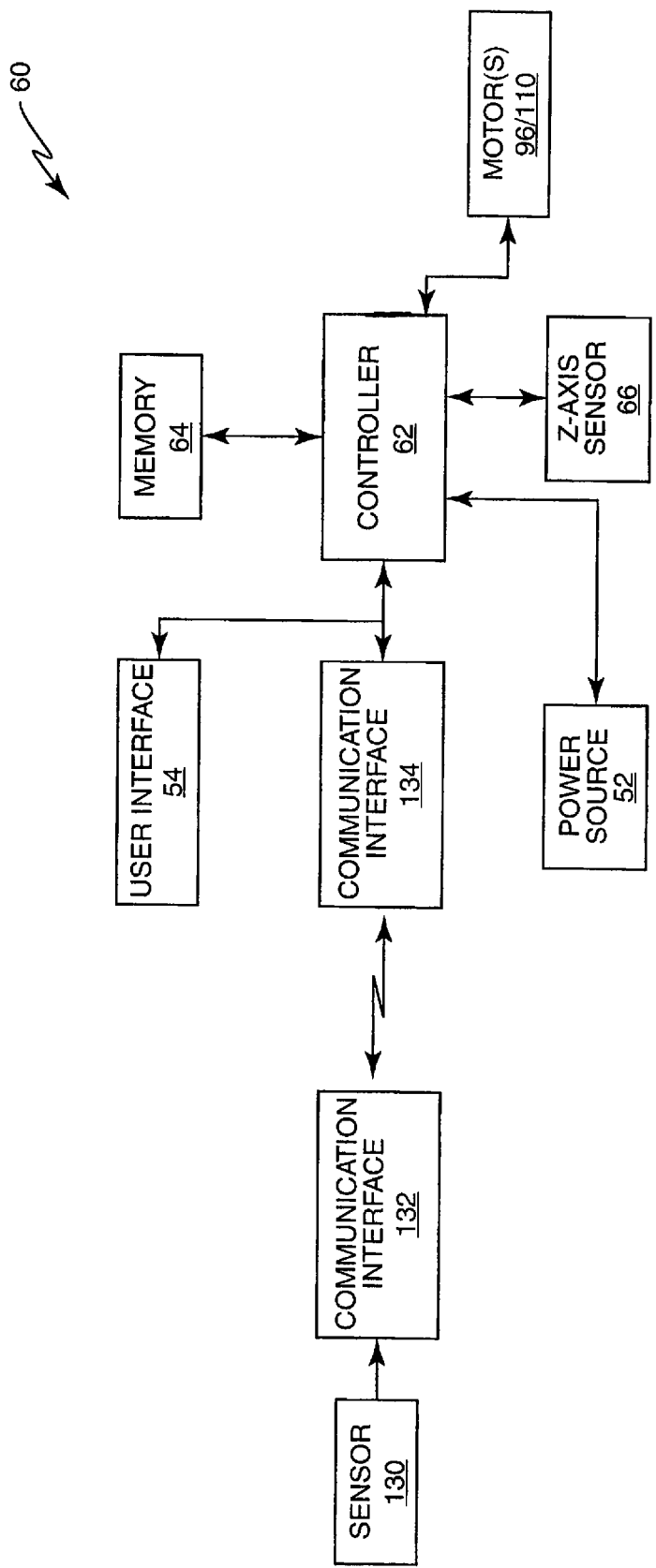
FIG. 9 is a block diagram illustrating a control circuit for controlling the stabilizer according to another embodiment of the present invention.

The present invention may, of course, be carried out in other ways than those specifically set forth herein without departing from essential characteristics of the invention. For example, as previously stated, a panning control mechanism may be included in the handle assembly 20 in some embodiments of the present invention. However, the invention is not limited exclusively to this type of panning control mechanism. FIGS. 8 and 9 illustrate another embodiment of the present invention wherein the handle assembly 20 includes another type of panning control mechanism. As seen in FIG. 8, the stabilizer 10 may include a sensor 130 or other user control such as a switch or button, for example, integrated with the handle grip 24. A communication interface 132 may also be included in the handle assembly 20 to communicate signals output by the sensor 130 to the controller 62.

In operation, the user may vary the rotational velocities of the first and second disks 94, 108 independently of each other by swiping a finger, for example, over the sensor 130. An output of the sensor 130 is sent to the controller 62 via a receiving communication interface 134 disposed on the PCB 50. The controller 62 can then generate control signals to vary the speed of one or both of the disks 94, 108 to produce reaction torques to cause the stabilizer 10 to pan in either direction about the z-axis. For example, increasing the velocity of the first disk 94 and decreasing the velocity of the second disk 108 may cause the stabilizer 10 to pan in a first direction about the z-axis. Decreasing the velocity of the first disk 94 and increasing the velocity of the second disk 108 may cause the stabilizer 10 to pan in the opposite direction about the z-axis. Independently controlling the rotational velocities of the disks allows the user to control the panning motion of the stabilizer 10. Those skilled in the art will appreciate that the communication interfaces 132, 134 may be any interface known in the art. Some suitable examples include, but are not limited to, wireless interfaces such as BLUETOOTH and ZIGBY.

Figure 10:
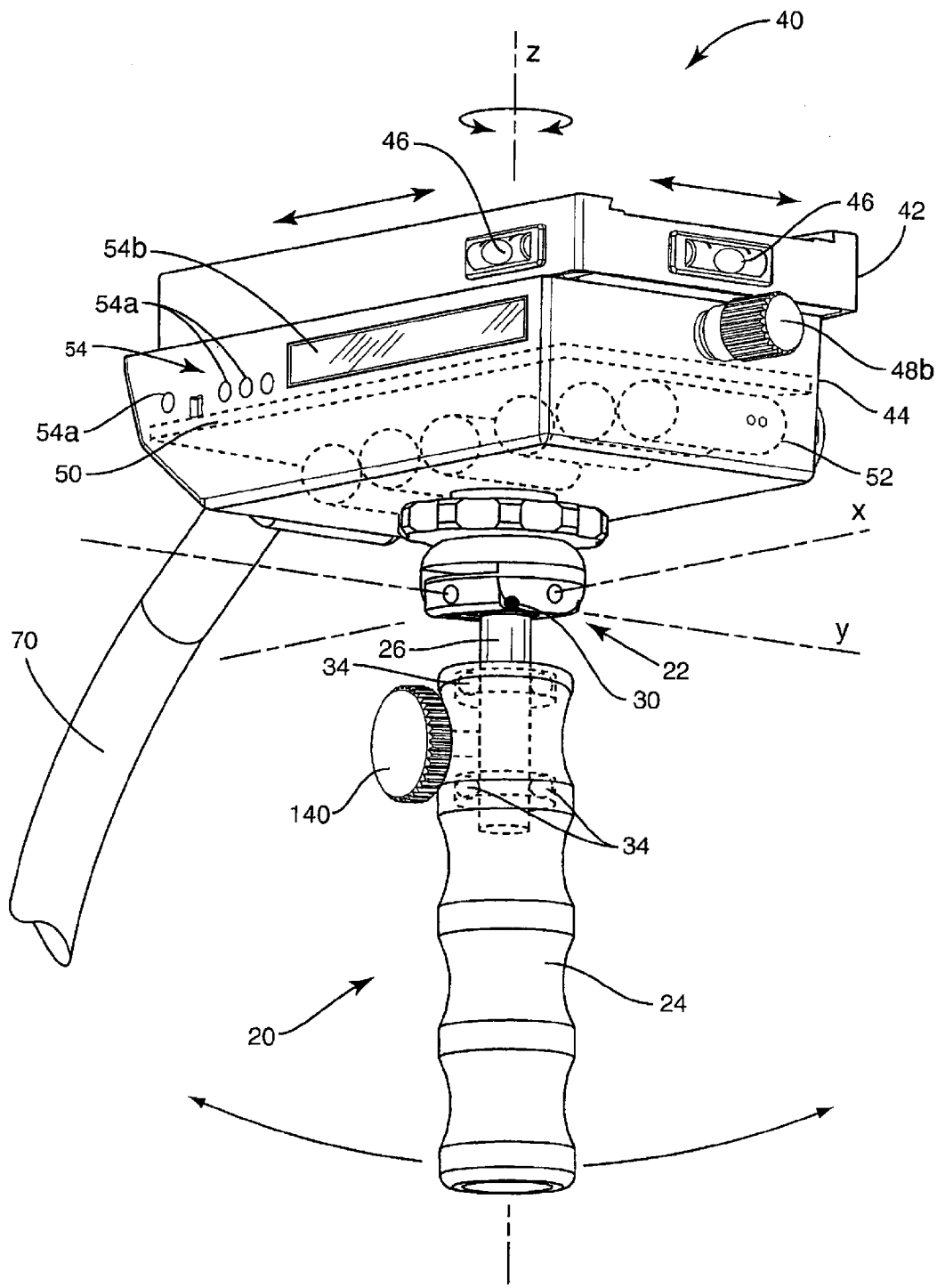
FIG. 10 is a perspective view that illustrates a handle configuration according to another embodiment of the present invention.

FIG. 10 illustrates another embodiment of the panning control mechanism that prevents the shaft 26 from rotating within the handle grip 24. This embodiment directly couples z-axis rotation to the user's hand. This allows some rotational jitter, but permits direct control of the panning motion through the user's wrist, arm or body motion.

In this embodiment, the mechanism comprises a mechanical fastener 140, such as a threaded thumb-screw, that permits the user to lock and unlock the stabilizer 10. Particularly, the fastener 140 threads into and out of a corresponding opening formed in the handle grip 24. Turning the fastener 140 into the handle grip 24 causes the fastener 140 to contact a flat portion formed on the shaft 26 in a direction that is generally orthogonal to the z-axis. This prevents the shaft 26 from rotating within the handle grip 24 thereby preventing the stabilizer 10 from rotating about the longitudinal z-axis, and allowing the alignment of the handle grip 24 relative to the x-axis to be controlled. Turning the fastener 140 in the opposite direction unlocks the stabilizer 10 so that z-axis rotation is allowed.

Figure 11:
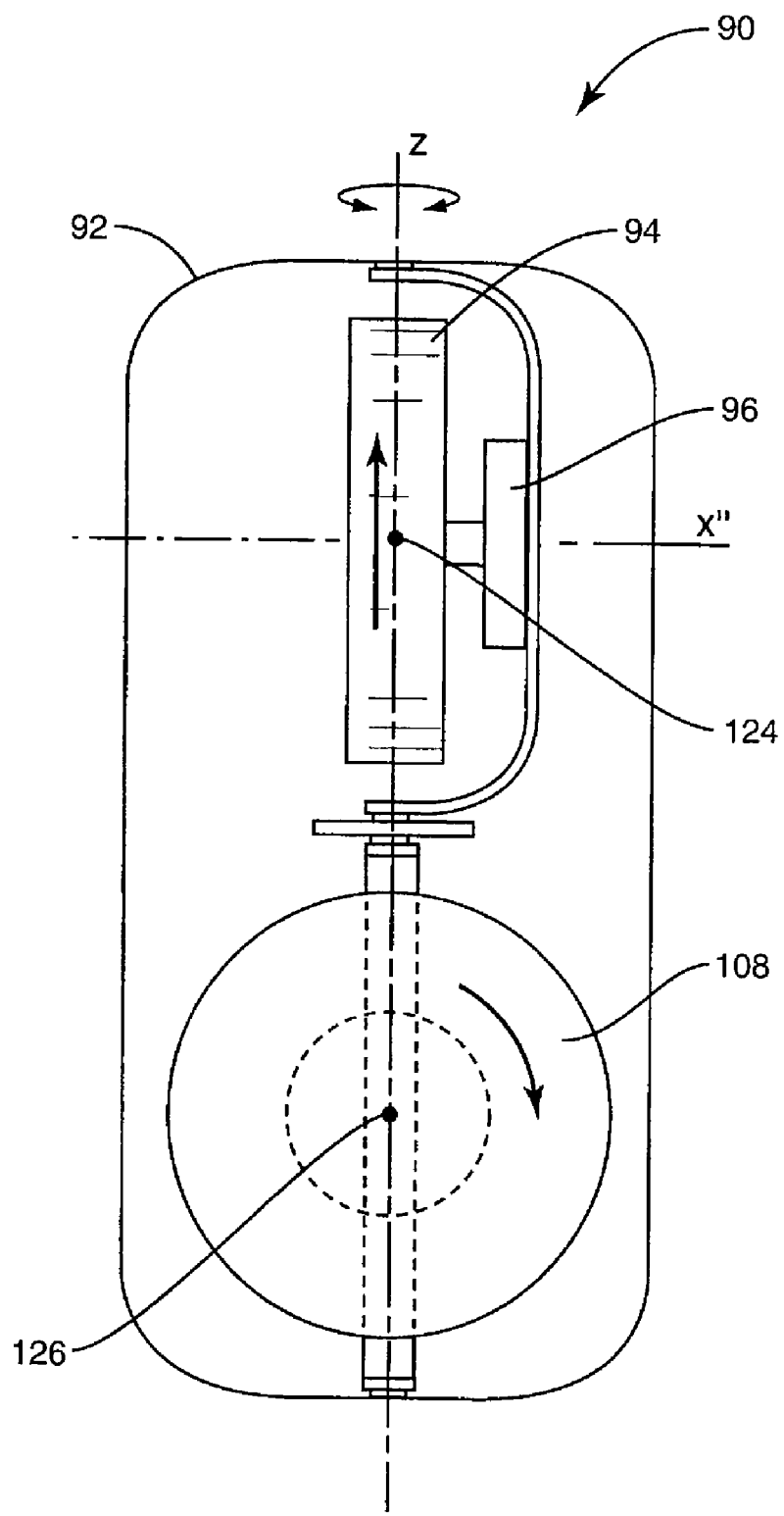
FIGS. 11 and 12 are perspective views illustrating a gyroscope pod configured according to another embodiment of the present invention.
Figure 12:
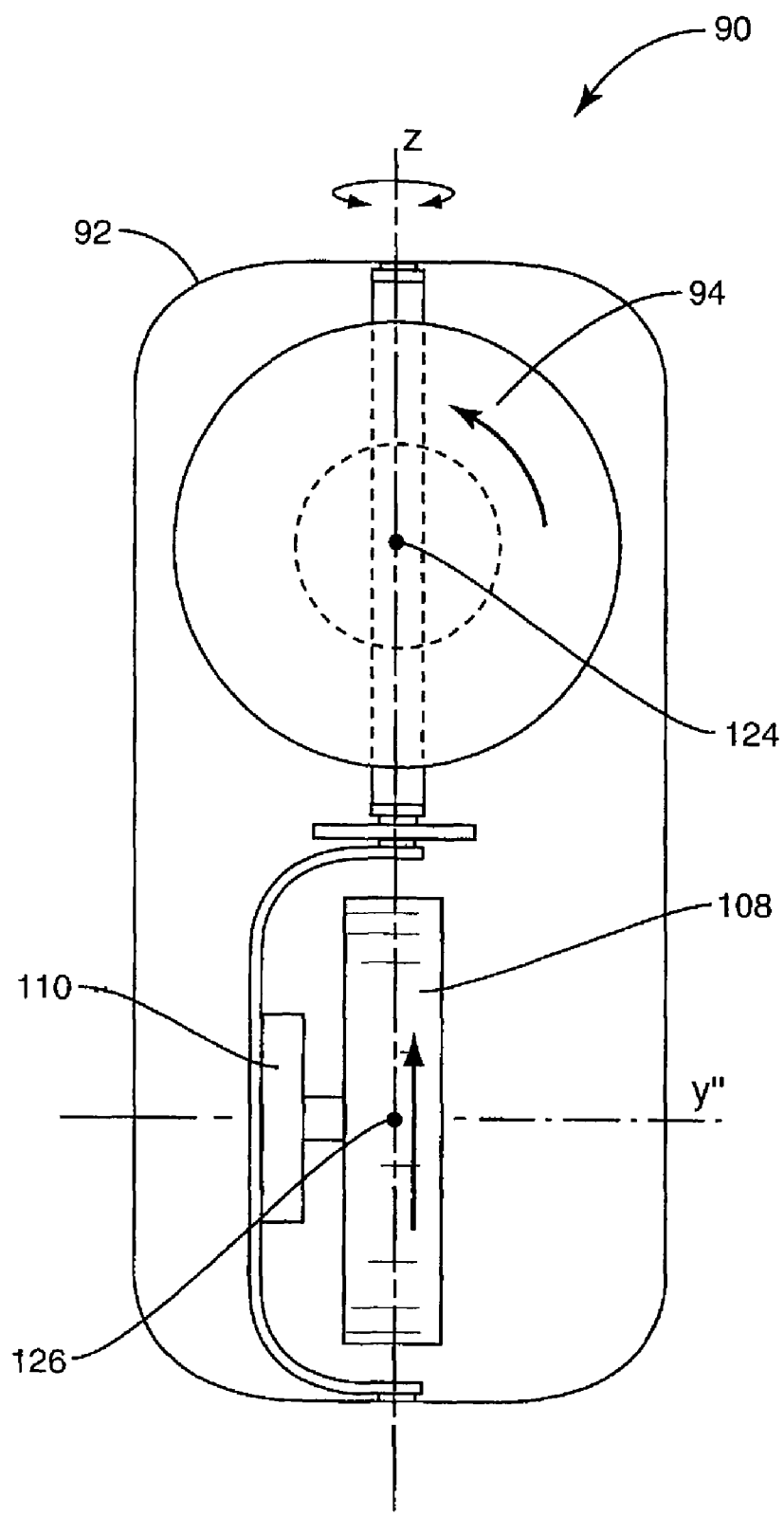

FIGS. 11 and 12 illustrate another embodiment wherein the gyroscope disks 94, 108 have different orientations. Particularly, the rotational axes of the disks 94, 108 were co-linear with the z-axis in previous embodiments. However, in this embodiment, the disks 96, 108 are oriented such that their respective rotational axes x", y" are orthogonal to the z-axis. The x" and z-axes, and y" and z-axes, still intersect at their respective common intersection points 124, 126, and are aligned along the z-axis with common intersection point 30. Although not explicitly shown in these figures, coil springs may be used to automatically restore the rotating disks to their respective neutral position, and to restrain the precession of the disks as previously described.

Figure 13:
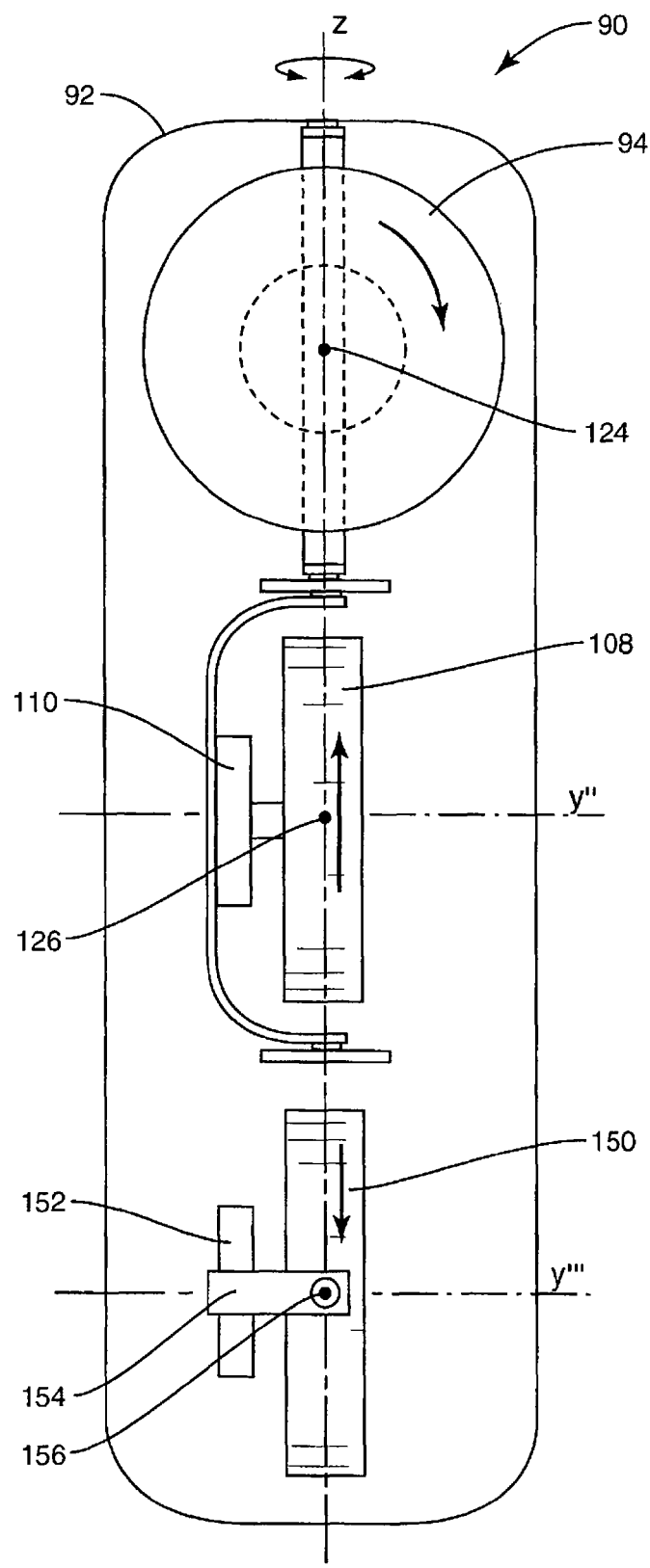
FIGS. 13 and 14 are perspective views illustrating a gyroscope pod configured according other embodiments of the present invention.
Figure 14:
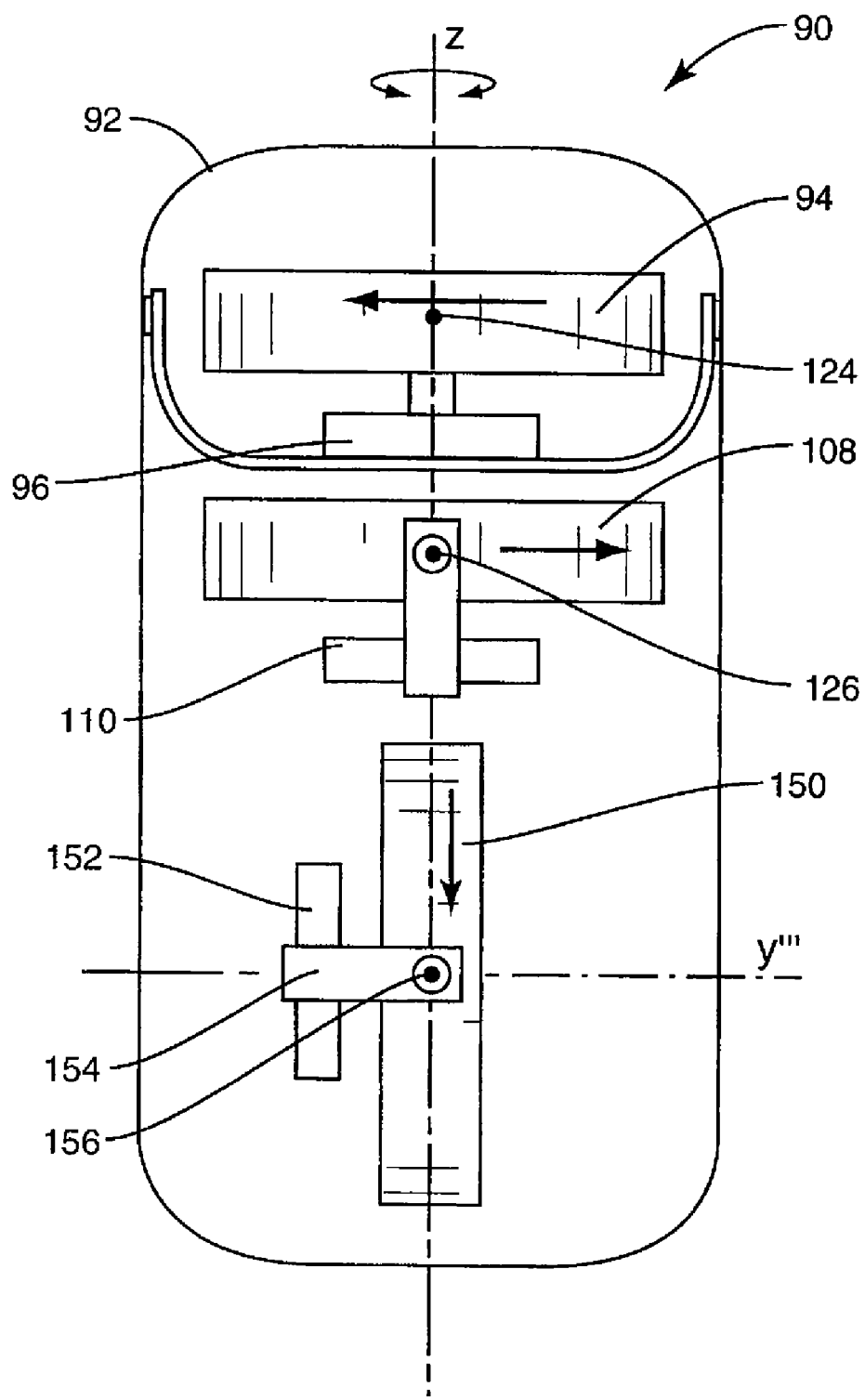

FIGS. 13 and 14 illustrate other embodiments wherein the gyroscope pod 90 includes a third disk 150. Disk 150 is mounted to a bracket 154 that is gimbaled to pivot about the x'''-axis, and has a similar orientation as disk 108. In FIG. 13, all three disks 94, 110, 150 are oriented to rotate about axes that are generally orthogonal to the z-axis. In FIG. 14, disks 94 and 108 are oriented to rotate about the z-axis, while disk 150 is oriented to rotate about the y'''-axis that is orthogonal to the z-axis. The disk 150 is further gimbaled to pivot about an axis that is orthogonal to both the y''' and z-axes, although in other embodiments, the disk 150 may be gimbaled to pivot about the y'''-axis. A sensorless BLDC motor 152 drives the rotation of disk 150 about the rotational axis y''' according to control signals generated by controller 62. In each embodiment, the y''' and the z-axes remain orthogonal to each other and intersect at a common intersection point 156. The common intersection point 156 is aligned along the z-axis with the other intersection points 30, 124, and 126. As above, coil springs may be used to automatically restore the rotating disks to their respective neutral positions, and to restrain the precession of the disks.

Figure 15:
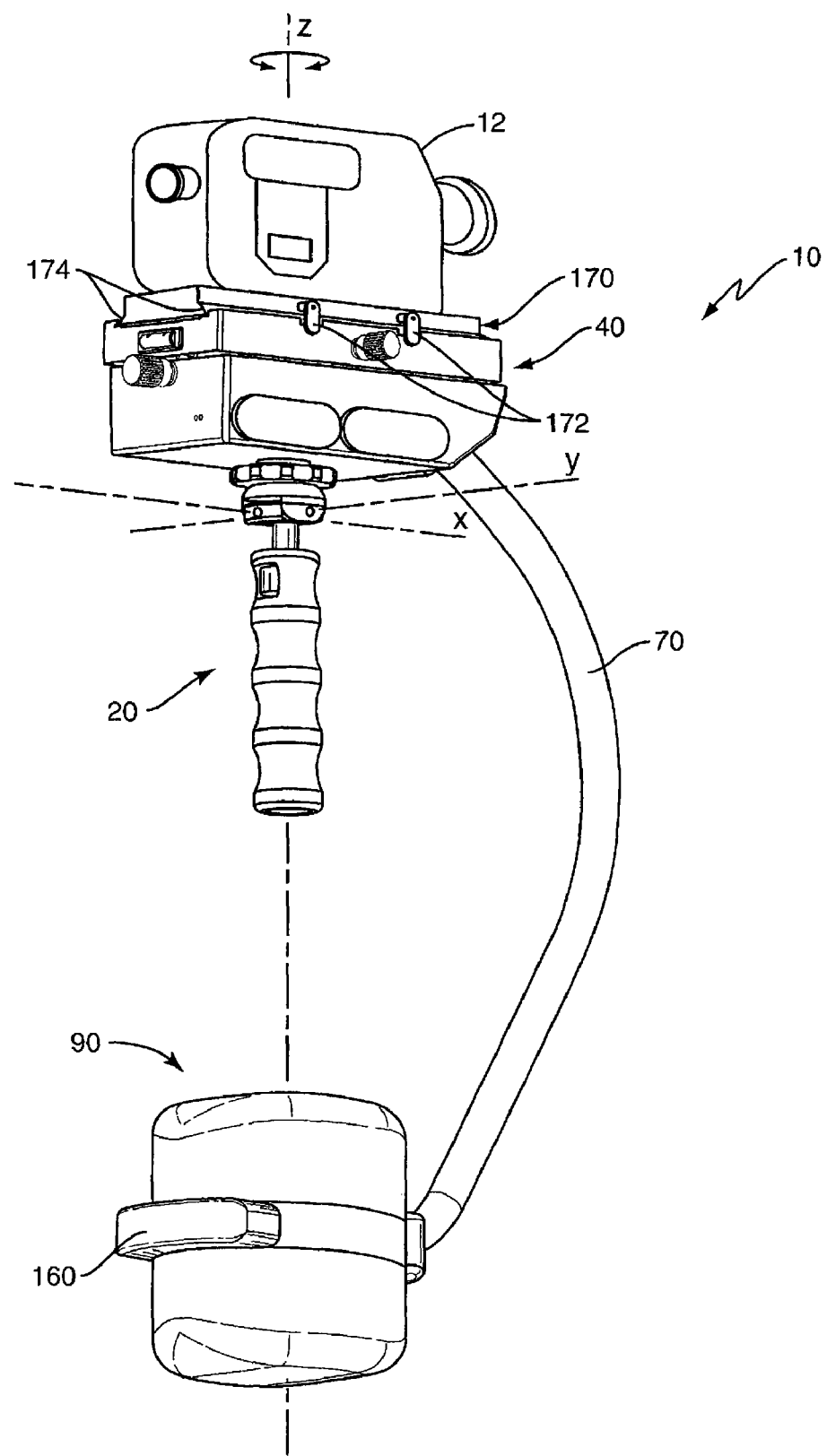
FIG. 15 is a perspective view illustrating a stabilizer configured according to another embodiment of the present invention.

FIG. 15 illustrates an embodiment wherein the stabilizer 10 is weighted to facilitate cameras 12 that are too heavy or too light for the adjustment mechanism to obtain a proper balance about the z-axis. Particularly, for cameras that are too heavy, one or more masses 160 may be releasably attached to an exterior of the gyroscope pod 90 using any mechanical fastener known in the art. The mass 160 counterbalances the weight of the camera 12 so that the user can obtain a proper z-axis balance using the adjustment mechanism 28.

For cameras 12 that are too light, the camera 12 is raised above the platform 40 with a camera mounting plate 170. The camera mounting plate 170 attaches to the camera 12 using a screw or other mechanical fastener. The camera mounting plate can be positioned along the x-axis of the platform 42 to provide additional x-axis camera balancing range.

In operation, the camera 12 is connected to the mounting plate 170 and the plate 170 is mounted to the platform 42. Any method known in the art may be used to attach the plate 170 to the platform 42, but in this embodiment, both the platform 42 and the plate 170 are formed to include corresponding dovetails 174. The dovetails 174 permit the plate 170 to slidingly engage the platform 42 such that the plate 170 is secure on one side. One or more finger operated locking mechanisms 172 are movable between locked and unlocked positions, and are positioned opposite the dovetail features 174. The locking mechanisms 172 allow the user to secure the mounting plate 170 and the camera 12 to the platform 42 without impeding the ability of the platform 42 to move within the x-y plane.

It should also be noted that the previous embodiments illustrate the gyroscope pod 90 as using coil springs 104, 122. While the arc proscribed by the moving spring anchor point provides a desirable non-linear increasing spring force for increasing bracket 100 angles, non-linear coil springs, such as springs with varying winding diameter, can also be used. In some embodiments, non-linear springs can provide improved performance over standard linear coil springs by further reducing the tendency for gyro jump while minimizing restraining force for low precession angles.

It should also be noted that in some embodiments of the present invention, the isolation provided by the pivot support 22 is not used. Instead, the user may support the camera 12 by placing his or her hand(s) directly under the base assembly 50. This mode of operation will still benefit from the dynamic stabilization provided by the gyroscope pod 90, but provides the user a greater degree of control over the camera movement. Controlling the stabilizer 10 in this manner is also easy to learn, and is particularly well suited for relatively motionless telephoto shots.

The present embodiments are to be considered in all respects as illustrative and not restrictive, and all changes coming within the meaning and equivalency range of the appended claims are intended to be embraced therein.

What is claimed is:

1. A stabilizer for a hand-held camera, the stabilizer comprising:
    a base assembly comprising:
        a movable platform configured to receive a hand-held camera; and
        a base compartment including a power source configured to power the stabilizer, and a controller configured to dynamically control the stabilizer to stabilize the hand-held camera;
    a handle assembly extending along a longitudinal axis orthogonal to the base assembly to pivotably connect a handle to the base assembly; and
    a gyroscope suspended below the base assembly to stabilize the hand-held camera during motion, the gyroscope comprising at least first and second rotatable members, each having an independent center of rotation that is co-linearly aligned along the longitudinal axis.

2. The stabilizer of claim 1 further comprising a rigid strut configured to:
    suspend the gyroscope below the base assembly;
    co-linearly align the centers of rotation of the first and second rotatable members along the longitudinal axis; and
    electrically connect the gyroscope to the power source and to the controller disposed within the base compartment via one or more electrical conductors extending through an interior of the rigid strut.

3. The stabilizer of claim 1 wherein the handle assembly comprises a pivot support configured to pivotably connect the handle to the base assembly about first and second axes, and wherein the first, second, and longitudinal axes intersect each other at a common point within the pivot support, and are orthogonal to each other.

4. The stabilizer of claim 3 wherein the handle comprises a pan control mechanism configured to control a rotation of the stabilizer about the longitudinal axis.

5. The stabilizer of claim 3 wherein each rotatable member is configured to independently pivot about respective third and fourth axes.

6. The stabilizer of claim 5 wherein the third and fourth axes each intersect the longitudinal axis to form respective intersection points, and wherein the gyroscope is positioned such that each of the intersection points and the common point are co-linearly aligned along the longitudinal axis during motion of the stabilizer.

7. The stabilizer of claim 5 further comprising at least one biasing member associated with each rotatable member to yieldingly resist the pivoting motion of the rotatable members.

8. The stabilizer of claim 1 wherein the first and second rotatable members have axes. of rotation that are co-linearly aligned with the longitudinal axis.

9. The stabilizer of claim 1 wherein the first and second rotatable members have axes of rotation that are orthogonal to the longitudinal axis.

10. The stabilizer of claim 1 wherein the first rotatable member has an axis of rotation that is orthogonal to an axis of rotation for the second rotatable member.

11. The stabilizer of claim 1 wherein the first and second rotatable members rotate in opposite directions.

12. The stabilizer of claim 1 wherein the controller is further configured to control the gyroscope to switch between operating in a high-speed mode and a low-speed mode.

13. The stabilizer of claim 1 wherein the platform is configured to move in a plane that is orthogonal to the longitudinal axis and independently of the compartment member.

14. The stabilizer of claim 1 wherein the controller is configured to vary the rotational velocities of one or both of the first and second rotatable members.

15. The stabilizer of claim 14 further comprising a sensor configured to detect motion of the stabilizer about the longitudinal axis, and wherein the controller is configured to vary the rotational velocities of one or both of the first and second rotatable members responsive to signals output by the sensor.

16. The stabilizer of claim 14 wherein the controller is configured to vary the rotational velocities of one or both of the first and second rotatable members independently of each other responsive to user input.

17. A method of manufacturing a stabilizer for a hand-held camera, the method comprising:
    forming a base assembly to include:
        a movable platform that receives a hand-held camera; and
        a base compartment to house a power source to power the stabilizer and a controller to dynamically control the stabilizer to stabilize the hand-held camera;

connecting a handle assembly having a pivotable handle to the base assembly along a longitudinal axis that extends substantially orthogonal to the base assembly; and suspending a gyroscope having first and second rotatable members below the base assembly such that a center of rotation for each rotatable member is co-linearly aligned along the longitudinal axis.

18. The method of claim 17 further comprising:

suspending the gyroscope below the base assembly via a rigid strut such that the centers of rotation are co-linearly aligned along the longitudinal axis; and electrically connecting the first and second rotatable members to the power source and the controller via one or more electrical conductors extending through an interior of the rigid strut.

19. The method of claim 17 wherein connecting the handle assembly comprises:

forming the handle assembly to include a pivot support that defines first and second axes about which the handle pivots; and positioning the pivot support such that the first, second, and longitudinal axes intersect each other at a common point within the pivot support.

20. The method of claim 19 further comprising forming a pan control mechanism within the handle to control a rotation of the stabilizer about the longitudinal axis.

21. The method of claim 17 further comprising pivotably connecting each rotatable member to an interior of the gyroscope housing such that the first rotatable member pivots about a third axis, and the second rotatable member pivots independently about a fourth axis.

22. The method of claim 21 further comprising providing at least one biasing member for each rotatable member to yieldingly resist the pivoting movement of the rotatable members.

23. The method of claim 17 wherein suspending the gyroscope below the base assembly comprises suspending the gyroscope below the base assembly to co-linearly align an axis of rotation for each of the first and second rotatable members with the longitudinal axis.

24. The method of claim 17 wherein suspending the gyroscope below the base assembly comprises suspending the gyroscope below the base assembly such that an axis of rotation for each of the first and second rotatable members is orthogonal to the longitudinal axis.

25. The method of claim 17 wherein suspending the gyroscope below the base assembly comprises suspending the gyroscope below the base assembly such that an axis of rotation of the first rotatable member is orthogonal to the axis of rotation of the second rotatable member.

26. The method of claim 17 wherein forming the base assembly comprises forming the platform to move in a plane that is orthogonal to the longitudinal axis and independently of the compartment member.

27. The method of claim 17 further comprising configuring the controller to control a rotational velocity of at least one of the first and second rotatable members.

28. The method of claim 27 wherein controlling a rotational velocity of at least one of the first and second rotatable members comprises varying the rotational velocity of at least one of the first and second rotatable members responsive to detecting movement of the stabilizer about the longitudinal axis.

29. The method of claim 27 wherein controlling a rotational velocity of at least one of the first and second rotatable members comprises varying the rotational velocities of the first and second rotatable members independently of each other responsive to user input.

30. A stabilizer for a hand-held camera, the stabilizer comprising:

a base assembly comprising:
- a movable platform configured to receive a hand-held camera; and
- a base compartment having a power source to power the stabilizer;

a handle assembly extending along a longitudinal axis orthogonal to the base assembly to pivotably connect a handle to the base assembly;

a gyroscope suspended below the base assembly to stabilize the hand-held camera during motion and electrically connected to the base compartment, the gyroscope comprising at least first and second rotatable members, each having an independent center of rotation that is co-linearly aligned along the longitudinal axis; and a controller housed within the base compartment and programmed to switch an operating mode of the gyroscope between a high-speed mode to stabilize the hand-held camera during movement, and a low-speed mode to permit a user to adjust an amount of gyro response to the movement of the stabilizer.

* * * * *